Figure 1:
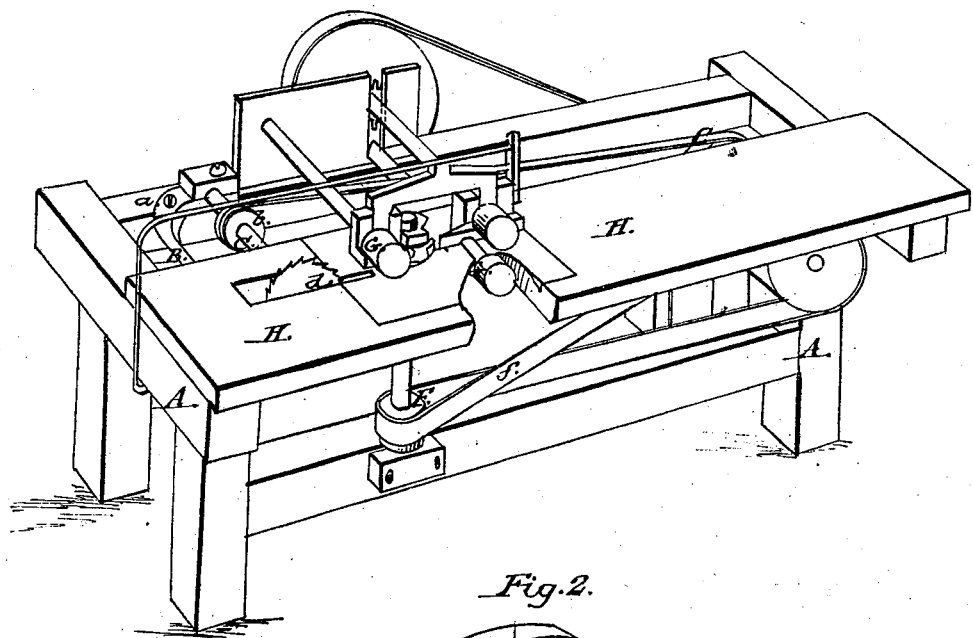

F. Ellis,
Hoop Machine
No. 98,240.        Patented Dec. 28, 1869.

Witnesses:
James Thierry
H. F. Eberts

Inventor:
Foster Ellis
per
Thos. S. Sprague
attorney

United States Patent Office.

FOSTER ELLIS, OF SYLVANIA, OHIO, ASSIGNOR TO HIMSELF AND JOHN S. ELLIS, OF SAME PLACE.

Letters Patent No. 98,240, dated December 28, 1869.

IMPROVEMENT IN HOOP-CUTTING AND DRESSING-MACHINE.

The Schedule referred to in these Letters Patent and making part of the same.

*To whom it may concern:*

Be it known that I, FOSTER ELLIS, of Sylvania, in the county of Lucas, and State of Ohio, have invented a new and useful Improvement in Hoop-Cutting Machines; and I do declare that the following is a true and accurate description thereof, reference being had to the accompanying drawings, and to the letters of reference marked thereon, and being a part of this specification.

The nature of this invention relates to an improved construction of machines, whereby the hoops will not only be cut, but also be finished upon the outside, in the passage through the machine.

The invention consists in a combination of a circular saw, cutting-head, and feed-rollers, driven by any suitable power, with a proper frame, the whole so arranged as to effectually perform the required work, and in the adjustability of the saw, for cutting any required thickness.

In the drawings—

A represents a frame, which carries the working-parts of the machine.

Secured to this frame is a yoke, B, by means of set-screws $a$, which pass through slotted holes in said yoke, into the upper timbers of the frame.

C is a saw-shaft, properly journaled at each end to the yoke B, and is provided with a pulley, $b$, by means of which the shaft is rotated by the belt $c$.

To this shaft is secured the circular saw $d$, the position of which with the shaft and yoke may be varied, to suit the thickness of the hoops required, by means of two set-screws $a$, and slotted holes in the yoke, as heretofore described.

E is a cutter-head, rotating with the shaft $e$, to which it is attached, and which is journaled vertically to the frame A provided with a pulley, F, and to which motion is communicated by the belt $f$.

G are feed-rollers, of the usual form, and driven in any convenient manner, to carry the boards to the cutter-head and saw.

The cutter-head E is provided with and has secured thereto, in the usual manner, steel cutters $g$, so arranged that the upper edge of one is longer than the lower edge, so that the face of the cutter will be inclined slightly from a vertical position, in order to give a bevel to the face of the hoop.

The upper edge of this cutter is provided with an offset, $h$, which is provided with a cutting-edge, in order to smooth and finish the upper edge of the hoop. The other cutter is inclined in an opposite direction, and provided at its lower edge with a similar offset, to smooth and finish the lower edge of the hoop.

A suitable board or plank having been selected to be made into hoops, and the saw having been adjusted to cut the desired thickness, the board is laid upon the table H, and its end inserted between the feed-rollers, which carry it forward to the cutter-head and saw.

In its passage, the cutters dress the edge of the board, and the top and bottom thereof, sufficiently far to make the thickness of the hoop required.

In its further passage, the saw cuts off from the board, the hoop, of the desired thickness, with its face and edges smooth and dressed, ready for use. Any other form of knife may be used, if desired.

In order the better to illustrate the device, I present two views—

Figure 2:
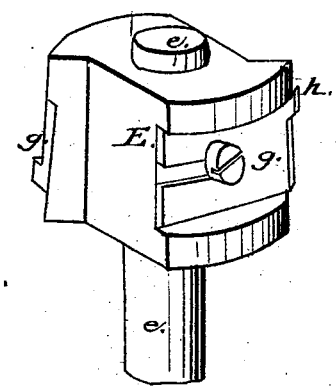

Figure 1 being a perspective view, with the portion of the table broken out, and Figure 2, an enlarged view of the cutter-head and cutter.

I am aware that machines for sawing hoops, and combined planing and sawing-machines have been in use. I disclaim any and all of them, and

What I claim as my invention, and desire to secure by Letters Patent, is—

1. The cutter-head E, provided with cutters $g$ $h$, constructed as above described and shown, for the purpose of dressing the face and both edges of a hoop at one operation, as above described and shown.

2. The combination of the saw $d$, the shaft C, the pulley $b$, the belt $c$, and the yoke B, with the cutter-head E, provided with cutters $g$ $h$, the shaft $e$, the pulley F, the belt $f$, the feed-rollers G, and the table H, in connection with the frame A, when constructed, arranged, and operating as and for the purpose above mentioned.

FOSTER ELLIS.

Witnesses:
JAS. I. DAY,
H. F. EBERTS.